United States Patent
Abe

(10) Patent No.: US 10,637,663 B2
(45) Date of Patent: Apr. 28, 2020

(54) SIGNATURE VERIFICATION SYSTEM, SIGNATURE-DEVICE, VERIFICATION DEVICE, AND SIGNATURE VERIFICATION METHOD

(71) Applicant: NIPPON TELEGRAPH AND TELEPHONE CORPORATION, Tokyo (JP)

(72) Inventor: Masayuki Abe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1117 days.

(21) Appl. No.: 14/371,110

(22) PCT Filed: Jan. 18, 2013

(86) PCT No.: PCT/JP2013/050881
§ 371 (c)(1),
(2) Date: Jul. 8, 2014

(87) PCT Pub. No.: WO2013/111673
PCT Pub. Date: Aug. 1, 2013

(65) Prior Publication Data
US 2014/0369494 A1    Dec. 18, 2014

(30) Foreign Application Priority Data

Jan. 24, 2012 (JP) ................. 2012-012224

(51) Int. Cl.
*H04L 9/30* (2006.01)
*G09C 1/00* (2006.01)
*H04L 9/32* (2006.01)

(52) U.S. Cl.
CPC .............. *H04L 9/3006* (2013.01); *G09C 1/00* (2013.01); *H04L 9/3073* (2013.01); *H04L 9/3218* (2013.01); *H04L 9/3247* (2013.01)

(58) Field of Classification Search
CPC ... H04L 9/3006; H04L 9/3218; H04L 9/3073; H04L 9/3247; G09C 1/00
See application file for complete search history.

(56) References Cited

U.S. PATENT DOCUMENTS

2010/0153712 A1*  6/2010  Gentry ................. H04L 9/3073
                                              713/156

OTHER PUBLICATIONS

Abe, M. et al., "Signing on Elements in Bilinear Groups for Module Protocol Design," IACR Cryptology ePrint Archive 2010 (2010): 133.*

(Continued)

*Primary Examiner* — Theodore C Parsons
(74) *Attorney, Agent, or Firm* — Oblon, McClelland, Maier & Neustadt, L.L.P.

(57) ABSTRACT

A group structure preserving signature system that can be applied to groups based on symmetric bilinear mapping, that reduces the signature length, and that enables efficient computation of verification equations is provided. At least, information indicating p, $G_1$, $G_2$, $G_T$, e, $g_1$, and $g_2$, information needed to obtain $e(h_u, h_v)$, and data that includes $g_s$, $h_s$, $g_t$, $h_t$, $\{g_1, h_1\}, \ldots, \{g_K, h_K\}$ are held as a public key vk, and data that includes vk, $\gamma_s$, $\delta_s$, $\gamma_t$, $\delta_t$, $\delta_u$, $\delta_v$, $\{\gamma_1, \delta_1\}, \ldots, \{\gamma_K, \delta_K\}$ are held as a secret key sk. A signature device selects $\zeta$ and $\rho$ at random from integers between 0 and p−1, both inclusive, obtains w, s, t, and r, and generates, as a signature σ, data that includes w, s, t, and r. A verification device verifies the signature σ by using two verification equations.

8 Claims, 3 Drawing Sheets

(56) References Cited

OTHER PUBLICATIONS

Abe, M. et al., "Optimal structure-preserving signatures in asymmetric bilinear groups", Advances in Cryptology—CRYPTO 2011, Springer Berlin Heidelberg 2011, pp. 649-666.*
Abe, M. et al., "A signature scheme with efficient proof of validity", Coding and Cryptology, Springer Berlin Heidelberg 2011, pp. 1-10.*
Abe, M. et al., "Separating short structure-preserving signatures from non-interactive assumptions", Advances in Cryptology—ASIACRYPT 2011, Springer Berlin Heidelberg 2011, pp. 628-646.*
Abe, M. et al., "Efficient mesage space extension for automorphic signatures", Information Security, Springer Berlin Heidelberg 2011, pp. 319-330.*
Groth, J., et al., "Efficient Non-interactive Proof Systems for Bilinear Groups", LNCS 2965, Total 18 Pages, (2008).
Camenisch, J., et al., "Signature Schemes and Anonymous Credentials from Bilinear Maps", LNCS 3152, Total 17 Pages, (2004).
Green, M., et al., "Universally Composable Adaptive Oblivious Transfer", IACR ePrint archive, URL: http://eprint.iacr.org/cgi-bin/getfile.pl?entry=2008/163&version=20080806:150034&file=163.pdf, Total 18 Pages, (2008).
Abe, M., et al., "Signing on Elements in Bilinear Groups for Modular Protocol Design", IACR e-print, URL: http://eprint.iacr.org/2010/133, pp. 1-43, (2010).
Abe, M., et al., "Optimal Structure-Preserving Signatures in Asymmetric Bilinear Groups", CRYPTO 2011, Springer, Total 36 Pages, (2011).
International Search Report dated Mar. 19, 2013 in PCT/JP13/050881 Filed Jan. 18, 2013.

* cited by examiner

SIGNATURE VERIFICATION SYSTEM, SIGNATURE-DEVICE, VERIFICATION DEVICE, AND SIGNATURE VERIFICATION METHOD

TECHNICAL FIELD

The present invention relates to a signature verification system, a signature device, a verification device, and a signature verification method that provide a digital signature method which is easy to use in encryption protocols.

BACKGROUND ART

A digital signature is a value s that can be calculated only when a signer who knows a secret key sk corresponding to a public key pk uses the secret key sk correctly for a message M, and the value is used as an electronic signature. Any party can verify the validity of the correctly calculated signature by using the public key pk, and any third parties that do not know the secret key sk cannot obtain the valid signature s.

The digital signature is used as a basic element in a variety of encryption protocols used for electronic money, credentials systems, and the like. In particular, advanced uses are frequently found among applications that require private information of the user. For example, in combination with zero-knowledge proofs, if elements (public key pk, signature s, message M) of a signature are true ones that satisfy a verification equation, any third party is convinced of the fact with some or all of the elements kept secret.

Recent progress in pairing technology has enabled zero-knowledge proofs (Jens Groth and Amit Sahai, "Efficient Non-interactive Proof Systems for Bilinear Groups," Eurocrypt 2008, LNCS 2965, pp. 415-432) that efficiently prove the fact that elements of a group satisfy an equality defined as a product of bilinear mapping. Accordingly, if all the elements of a signature are group elements and if the signature verification equation is a product of bilinear mapping, the corresponding signature system can easily keep any element of the signature secret. The signature system in which all the elements of a signature are group elements and the signature verification equation is a product of bilinear mapping is referred to as a group structure preserving signature system.

Known conventional technologies of group structure preserving signature systems include the technologies in Non-patent literatures 1 to 4. The technology in Non-patent literature 1 is referred to as a CL-Signature method. This method, however, uses idealized impractical elements, which are referred to as random oracles, and its security in practical implementations is unclear.

The system in Non-patent literature 2 is an improved CL-Signature method which does not use random oracles. This method, however, ensures security only with respect to a message selected at random, and security from chosen message attacks, which is generally demanded as the security of signatures, is unclear.

Non-patent literature 3 describes a method that is guaranteed to be resistant to chosen message attacks. In this method, a signature consists of seven group elements $\sigma = (z, r, s, t, u, v, w)$ that satisfy the two verification equations given below.

$$e(a_1, \tilde{a}_1) e(a_2, \tilde{a}_2) = e(g_z, z) e(g_r, r) e(s, t) \Pi_{i=1}^{k} e(g_i, m_i),$$

$$e(b_1, \tilde{b}_1) e(b_2, \tilde{b}_2) = e(h_z, z) e(h_u, u) e(v, w) \Pi_{i=1}^{k} e(h_i, m_i)$$

All the elements in the verification equations that are not included in σ are public keys.

The system in non-patent literature 4 allows a signature to be composed of a smaller number of group elements than the system in Non-patent literature 3. This method, however, provides security only in groups based on asymmetric bilinear mapping, and there is specific attack in groups based on symmetric bilinear mapping, which is used often in encryption protocols.

PRIOR ART LITERATURES

Non-Patent Literatures

Non-patent literature 1: Jan Camenisch and Anna Lysyanskaya, "Signature Schemes and Anonymous Credentials form Bilinear Maps," Crypto 2004, LNCS 3152, pp. 56-72

Non-patent literature 2: Matthew Green and Susan Hohenberger, "Universally Composable Adaptive Oblivious Transfer," IACR e-Print archive, 2008/163 [retrieved on Dec. 31, 2011], Internet <URL http://eprint.iacr.org/cgi-bin/getfile.pl?entry=2008/163&version=20080806:150034&file=163.pdf>

Non-patent literature 3: Masayuki Abe, Kristiyan Haralambiev and Miyako Ohkubo, "Signing on Elements in Bilinear Groups for Modular Protocol Design," IACR e-print 2010/133 [retrieved on Dec. 31, 2011], Internet <URL http://eprint.iacr.org/2010/133>

Non-patent literature 4: Masayuki Abe, Jens Groth, Kristiyan Haralambiev, and Miyako Ohkubo, "Optimal Structure-Preserving Signatures in Asymmetric Bilinear Groups," Crypto 2011, Springer

SUMMARY OF THE INVENTION

Problems to be Solved by the Invention

The security of the technologies in Non-patent literatures 1 and 2 in actual implementations is unclear. In the system in Non-patent literature 3, a signature consists of seven group elements, and to verify a signature consisting of K group elements with respect to a message, 10+2K pairing operations are needed. This means a long signature bit length and a large amount of computation. The system in Non-patent literature 4 does not provide security in groups based on symmetric bilinear mapping.

In view of the problems given above, an object of the present invention is to provide a group structure preserving signature system that can be applied also to groups based on symmetric bilinear mapping, that has a short signature length, and that enables efficient computation of verification equations.

Means to Solve the Problems

A signature verification system according to the present invention comprises a signature device which generates a signature and a verification device which verifies the signature. It is assumed that $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M is $M = (m_1, \ldots, m_K)$, ^ represents a power; $\gamma_s$, $\delta_s$, $\gamma_t$, $\delta_t$, $\gamma_u$, $\delta_u$, $\gamma_v$, $\delta_v$, $\{\gamma_1, \delta_1\}, \ldots, \{\gamma_K, \delta_K\}$ are integers between 0 and p−1, both inclusive; and $g_s$, $h_s$, $g_t$, $h_t$, $g_u$, $h_u$, $g_v$, $h_v$, $\{g_1, h_1\}, \ldots, \{g_K, h_K\}$ are given as follows:

| | |
|---|---|
| $g_s = g_1{}^{\gamma_s}$ | $h_s = g_1{}^{\delta_s}$ |
| $g_t = g_1{}^{\gamma_t}$ | $h_t = g_1{}^{\delta_t}$ |
| $g_u = g_1{}^{\gamma_u}$ | $h_u = g_1{}^{\delta_u}$ |
| $g_v = g_2{}^{\gamma_v}$ | $h_v = g_2{}^{\delta_v}$ |
| $g_k = g_1{}^{\gamma_k}$ | $h_k = g_1{}^{\delta_k}$ | where $k=1, \ldots, K$.

The signature device comprises at least a signature recording unit and a signature generating unit. The signature recording unit records information indicating $p$, $G_1$, $G_2$, $G_T$, $e$, $g_1$, and $g_2$, information needed to obtain $e(g_u, g_v)$ and $e(h_u, h_v)$, and data that includes $g_s$, $h_s$, $g_t$, $h_t$, $\{g_1, h_1\}, \ldots, \{g_K, h_K\}$ as a public key vk and records data that includes vk, $\gamma_s$, $\delta_s$, $\gamma_t$, $\delta_t$, $\gamma_u$, $\delta_u$, $\gamma_v$, $\delta_v$, $\{\gamma_1, \delta_1\}, \ldots, \{\gamma_K, \delta_K\}$ as a secret key sk. The signature generating unit selects $\zeta$ and $\rho$ at random from integers between 0 and p−1, both inclusive, obtains w, s, t, and r, as given below, $$w = g_1^{\zeta},$$

$$s = g_2^{\rho},$$

$$t = \left(g_2^{\delta_u \cdot \delta_v - \delta_s \cdot \rho} \prod_{k=1}^{K} m_k^{-\delta_k}\right)^{1/\delta_t}$$

$$r = \left(g_2^{\gamma_u \cdot \gamma_v - \gamma_s \cdot \rho} \cdot t^{-\gamma_t} \prod_{k=1}^{K} m_k^{-\gamma_k}\right)^{1/\zeta}$$

and generates, as a signature σ, data that includes w, s, t, and r.

The verification device comprises at least a verification recording unit and a verifying unit. The verification recording unit records the public key vk. The verifying unit checks whether two equations $e(g_u,g_v)=e(g_s,s)e(g_t,t)(\Pi_{k=1}{}^K e(g_k,m_k))e(w,r),$ $e(h_u,h_v)=e(h_s,s)e(h_t,t)\Pi_{k=1}{}^K e(h_k,m_k)$ are satisfied, and determines that the signature is correct when the two equations are satisfied, or determines that the signature is incorrect when at least one of the two equations is not satisfied.

Here, $\gamma_u$ and $\gamma_v$ may be set to 0. In that case, $g_u=g_v=1$ and $e(g_u, g_v)=1$, so that the public key vk does not require any information to obtain $e(g_u, g_v)$. The secret key sk does not require $\gamma_u$ or $\gamma_v$. The signature generating unit should obtain r, as given below.

$$r = \left(g_2^{-\gamma_s \cdot \rho} \cdot t^{-\gamma_t} \prod_{k=1}^{K} m_k^{-\gamma_k}\right)^{1/\zeta}$$

The verifying unit should check whether the two equations given below are satisfied.

$1=e(g_s,s)e(g_t,t)(\Pi_{k=1}{}^K e(g_k,m_k))e(w,r),$ $e(h_u,h_v)=e(h_s,s)e(h_t,t)\Pi_{k=1}{}^K e(h_k,m_k)$

Effects of the Invention

A signature verification system according to the present invention performs verification by using two verification equations and can ensure security even with symmetric bilinear mapping, like the method in Non-patent literature 3. In addition, since a signature σ consists of four group elements w, s, t, and r, the signature can be made shorter than that in Non-patent literature 3, which requires seven group elements. If $\gamma_u$ and $\gamma_v$ are set to 0, the number of pairing operations in verification can be reduced to 6+2K; if $\gamma_u$ and $\gamma_v$ are selected at random, the number of operations can be reduced to 7+2K. Therefore, the amount of computation becomes smaller than that for 10+2K operations in Non-patent literature 3.

DETAILED DESCRIPTION OF THE EMBODIMENTS

Figure 1:
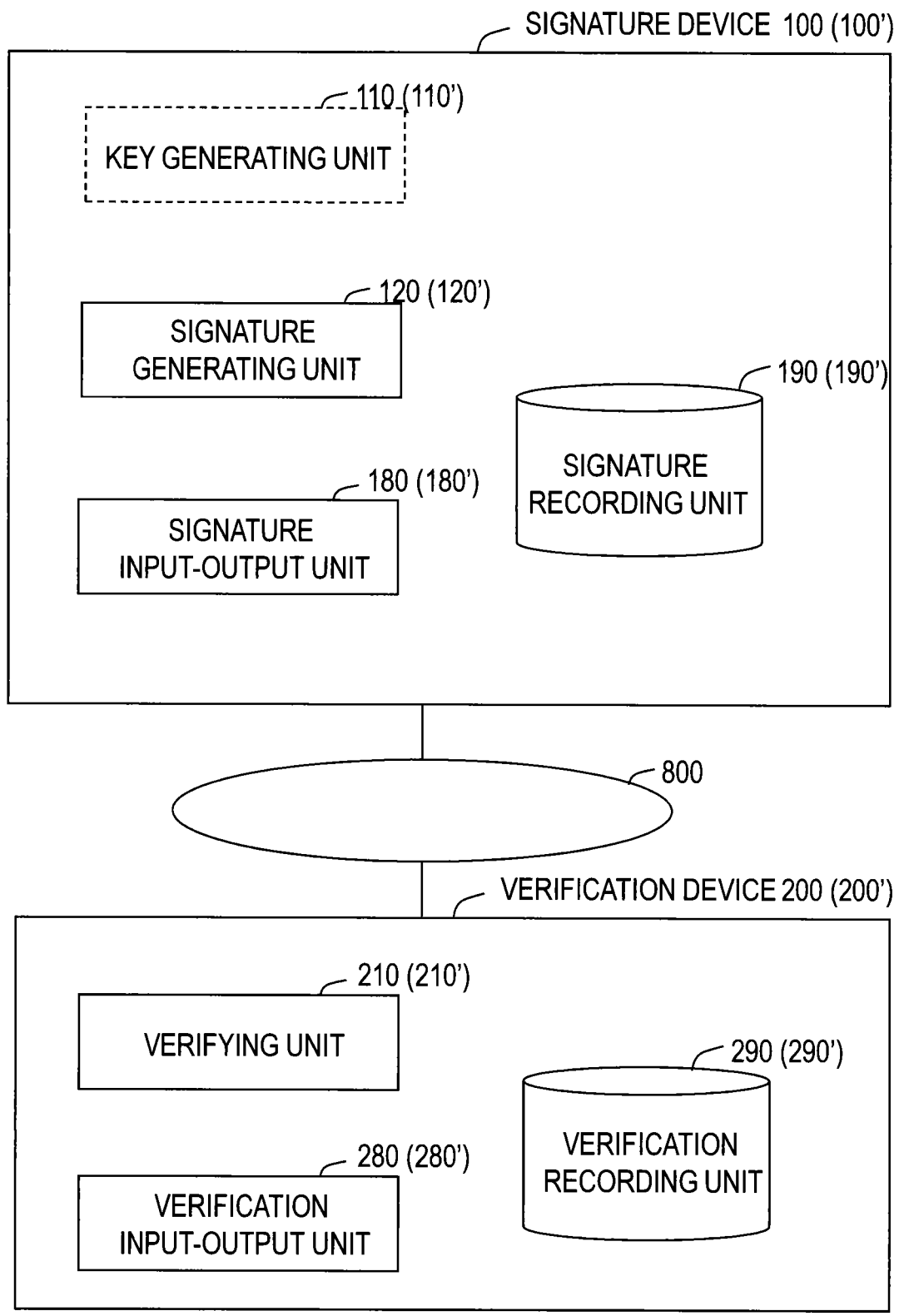
FIG. 1 is a view showing an example configuration of a signature verification system of the present invention.

Now, embodiments of the present invention will be described in detail. Components having identical functions will be denoted by the same reference numerals, and a duplicated description thereof will be omitted.

First Embodiment

Configuration and Processing

Figure 2:
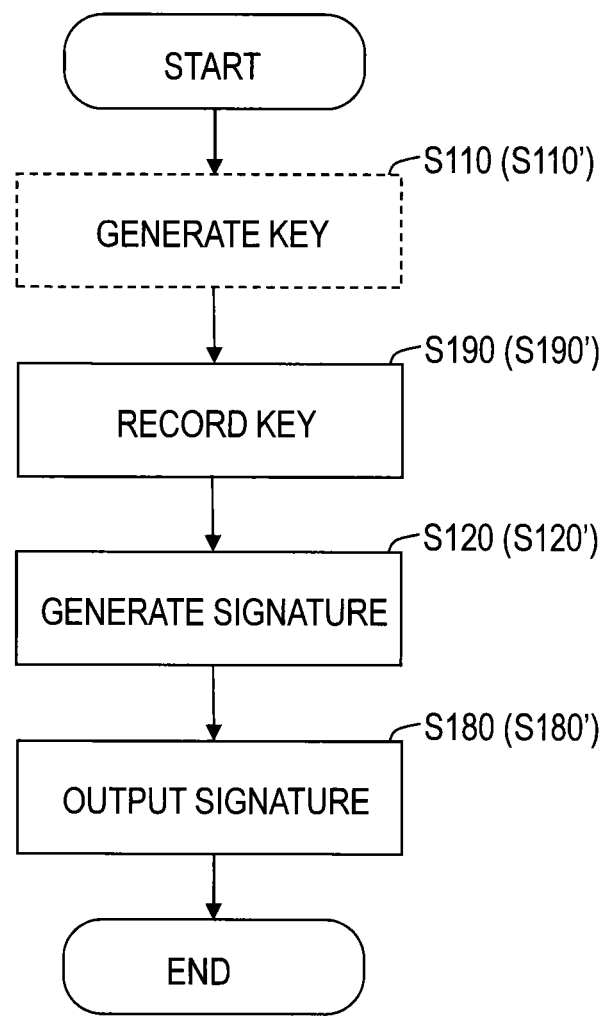
FIG. 2 is a view illustrating a processing flow of a signature device.
Figure 3:
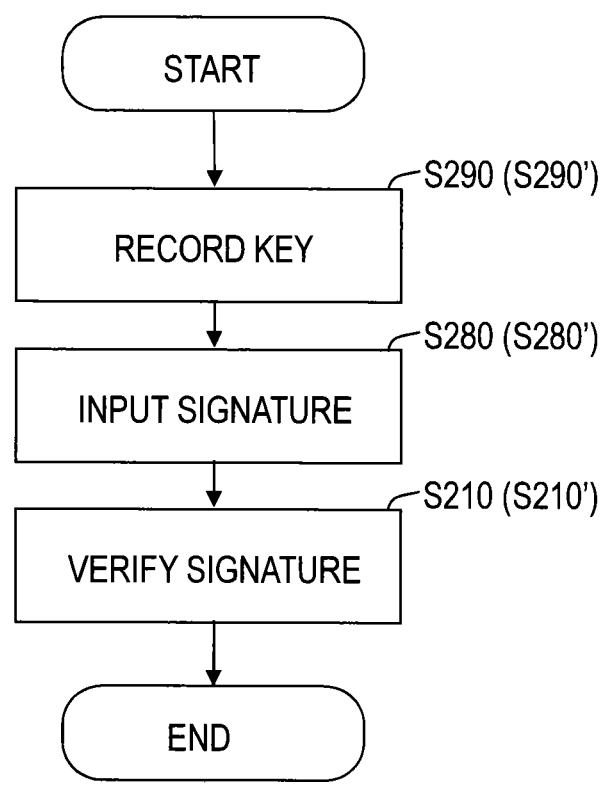
FIG. 3 is a view illustrating a processing flow of a verification device.

FIG. 1 shows an example configuration of a signature verification system of the present invention. FIG. 2 illustrates a processing flow of a signature device, and FIG. 3 illustrates a processing flow of a verification device. The signature verification system comprises at least a signature device 100 and a verification device 200. The signature device 100 records a secret key sk and a public key vk and generates a signature σ with respect to a message M. The verification device 200 records the public key vk and verifies whether the signature σ is a correct one generated by using the secret key sk for the message M. The public key vk, the message M, and the signature σ are shared by the signature device 100 and the verification device 200, and the sharing means may use a network or a portable recording medium. In FIG. 1, the signature device 100 and the verification device 200 are connected by a network 800.

The following symbols are used below: $G_1$, $G_2$, and $G_T$ represent groups of order p; e represents pairing of $G_1 \times G_2 \rightarrow G_T$; $g_1$ represents any generator of group $G_1$, $g_2$ represents any generator of group $G_2$; K represents a predetermined integer not smaller than 1; k represents an integer between 1 and K, both inclusive; $m_1, \ldots, m_K$ represent elements of group $G_1$; message M is $M=(m_1, \ldots, m_K)$; ^ represents a power.

A key generating unit 110 selects $\gamma_s$, $\delta_s$, $\gamma_t$, $\delta_t$, $\gamma_u$, $\delta_u$, $\gamma_v$, $\delta_v$, $\{\gamma_1, \delta_1\}$, ..., $\{\gamma_K, \delta_K\}$ from integers between 0 and p−1, both inclusive. The selection should be made at random. Then, $g_s$, $h_s$, $g_t$, $h_t$, $g_u$, $h_u$, $g_v$, $h_v$, $\{g_1, h_1\}$, $\{g_K, h_K\}$ are obtained as follows (S110):

| | | |
|---|---|---|
| $g_s = g_1\hat{}\gamma_s$ | $h_s = g_1\hat{}\delta_s$ | |
| $g_t = g_1\hat{}\gamma_t$ | $h_t = g_1\hat{}\delta_t$ | |
| $g_u = g_1\hat{}\gamma_u$ | $h_u = g_1\hat{}\delta_u$ | |
| $g_v = g_2\hat{}\gamma_v$ | $h_v = g_2\hat{}\delta_v$ | |
| $g_k = g_1\hat{}\gamma_k$ | $h_k = g_1\hat{}\delta_k$ | (k = 1, ..., K) |

These data items may be obtained beforehand and may be used in common for multiple signatures or may be changed each time a signature is generated.

The signature device 100 comprises at least a signature recording unit 190 and a signature generating unit 120. The key generating unit 110 may be comprised in the signature device 100 or in a different unit. The signature device 100 may also comprise a signature input-output unit 180 that exchanges data through the network 800. The signature recording unit 190 records information indicating p, $G_1$, $G_2$, $G_T$, e, $g_1$, and $g_2$, information needed to obtain $e(g_u, g_v)$ and $e(h_u, h_v)$, and data that includes $g_s$, $h_s$, $g_t$, $h_t$, $\{g_1, h_1\}$, ..., $\{g_K, h_K\}$, as the public key vk, and records data that includes vk, $\gamma_s$, $\delta_s$, $\gamma_t$, $\delta_t$, $\gamma_u$, $\delta_u$, $\gamma_v$, $\delta_v$, $\{\gamma_1, \delta_1\}$, ..., $\{\gamma_K, \delta_K\}$ as the secret key sk (S190). For example, a statement $\Lambda$ indicating p, $G_1$, $G_2$, $G_T$, e, $g_1$, and $g_2$, and $g_s$, $h_s$, $g_t$, $h_t$, $g_u$, $g_v$, $h_v$, $\{g_1, h_1\}$, ..., $\{g_K, h_K\}$ may be held as the public key vk. Alternatively, a statement $\Lambda$ indicating p, $G_1$, $G_2$, $G_T$, e, $g_1$, and $g_2$, and $g_s$, $h_s$, $g_t$, $h_t$, $e(g_u, g_v)$, $e(h_u, h_v)$ $\{g_1, h_1\}$, ..., $\{g_K, h_K\}$ may be held as the public key vk.

The signature generating unit 120 selects $\zeta$ and $\rho$ at random from integers between 0 and p−1, both inclusive, obtains w, s, t, and r as given below, and generates data that includes w, s, t, and r as the signature $\sigma$ (S120).

$$w = g_1^\zeta,$$

$$s = g_2^\rho,$$

$$t = \left(g_2^{\delta_u \cdot \delta_v - \delta_s \cdot \rho} \prod_{k=1}^{K} m_k^{-\gamma_k}\right)^{1/\delta_t}$$

$$r = \left(g_2^{\gamma_u \cdot \gamma_v - \gamma_s \cdot \rho} \cdot t^{-\gamma_t} \prod_{k=1}^{K} m_k^{-\gamma_k}\right)^{1/\zeta}$$

The message M for which the signature is made consists of K elements of group $G_1$. Ordinary messages are integers of any length, but the message M in the present invention consists of K elements of group $G_1$. If a message for which a signature is made is short, the message M should be created by padding so as to have K elements of group $G_1$. One of the elements of group $G_1$ should be chosen beforehand as the value to be padded with. The signature input-output unit 180 sends the signature $\sigma$ a through the network 800 to the verification device 200 (S180).

The verification device 200 comprises at least a verification recording unit 290 and a verifying unit 210. The verification recording unit 290 records the public key vk (S290). The verification device 200 may also comprise a verification input-output unit 280 that exchanges data through the network 800. The verification input-output unit 280 receives the signature $\sigma$ through the network 800 (S280).

The verifying unit 210 checks whether the following two equations are satisfied.

$$e(g_u, g_v) = e(g_s, s)e(g_t, t)(\Pi_{k=1}^{K} e(g_k, m_k))e(w, r),$$

$$e(h_u, h_v) = e(h_s, s)e(h_t, t)\Pi_{k=1}^{K} e(h_k, m_k)$$

If the two equations are satisfied, the verifying unit 210 determines that the signature is correct. If at least one of the two equations is not satisfied, the verifying unit 210 determines that the signature is incorrect (S210).

Description of Verification Equations

The left side of the first verification equation above is given as follows.

$$e(g_u, g_v) = e(g_1^{\gamma_u}, g_2^{\gamma_v})$$
$$= e(g_1, g_2)^{\gamma_u \cdot \gamma_v}$$

The right side is given as follows.

$$e(g_s, s)e(g_t, t)\left(\prod_{k=1}^{K} e(g_k, m_k)\right)e(w, r) =$$

$$e(g_1^{\gamma_s}, g_2^\rho)e\left(g_1^{\gamma_t}, \left(g_2^{\delta_u \cdot \delta_v - \delta_s \cdot \rho} \prod_{k=1}^{K} m_k^{-\delta_k}\right)^{1/\delta_t}\right)\left(\prod_{k=1}^{K} e(g_1^{\gamma_k}, m_k)\right)$$

$$e\left(g_1^\zeta, \left(g_2^{\gamma_u \cdot \gamma_v - \gamma_s \cdot \rho} \cdot t^{-\gamma_t} \prod_{k=1}^{K} m_k^{-\gamma_k}\right)^{1/\zeta}\right) = e(g_1, g_2)^{\gamma_s \cdot \rho}$$

$$e\left(g_1^{\gamma_t}, \left(g_2^{\delta_u \cdot \delta_v - \delta_s \cdot \rho}\right)^{1/\delta_t}\right)e\left(g_1^{\gamma_t}, \left(\prod_{k=1}^{K} m_k^{-\delta_k}\right)^{1/\delta_t}\right)\left(\prod_{k=1}^{K} e(g_1^{\gamma_k}, m_k)\right)$$

$$e\left(g_1^\zeta, \left(g_2^{\gamma_u \cdot \gamma_v - \gamma_s \cdot \rho} \cdot \left(g_2^{\delta_u \cdot \delta_v - \delta_s \cdot \rho} \prod_{k=1}^{K} m_k^{-\delta_k}\right)^{-\gamma_t/\delta_t} \prod_{k=1}^{K} m_k^{-\gamma_k}\right)^{1/\zeta}\right) =$$

$$e(g_1, g_2)^{\gamma_s \cdot \rho + \gamma_t \cdot (\delta_u \cdot \delta_v - \delta_s \cdot \rho)/\delta_t} e(g_1, g_2)^{\zeta \cdot (\gamma_u \cdot \gamma_v - \gamma_s \cdot \rho - \gamma_t \cdot (\delta_u \cdot \delta_v - \delta_s \cdot \rho)/\delta_t)/\zeta}$$

$$\prod_{k=1}^{K} e(g_1, m_k)^{\gamma_k} \prod_{k=1}^{K} e(g_1, m_k)^{\zeta \cdot (-\gamma_k)/\zeta} e\left(g_1, \left(\prod_{k=1}^{K} m_k^{-\delta_k}\right)\right)^{\gamma_t/\delta_t}$$

$$e\left(g_1, \left(\prod_{k=1}^{K} m_k^{-\delta_k}\right)\right)^{\zeta \cdot (-\gamma_t/\delta_t)/\zeta} = e(g_1, g_2)^{\gamma_u \cdot \gamma_v}$$

Accordingly, if the signature is correct, the first equation is satisfied. The left side of the second equation is given as follows.

$$e(h_u, h_v) = e(g_1^{\delta_u}, g_2^{\delta_v})$$
$$= e(g_1, g_2)^{\delta_u \cdot \delta_v}$$

The right side is given as follows.

$$e(h_s, s)e(h_t, t)\prod_{k=1}^{K} e(h_k, m_k) =$$

$$e(g_1^{\delta_s}, g_2^\rho)e\left(g_1^{\delta_t}, \left(g_2^{\delta_u \cdot \delta_v - \delta_s \cdot \rho} \prod_{k=1}^{K} m_k^{-\delta_k}\right)^{1/\delta_t}\right)\prod_{k=1}^{K} e(g_1^{\delta_k}, m_k) =$$

$$e(g_1, g_2)^{\delta_s \cdot \rho} e(g_1, g_2)^{\delta_t \cdot (\delta_u \cdot \delta_v - \delta_s \cdot \rho)/\delta_t}$$

-continued $$\prod_{k=1}^{K} e(g_1, m_k)^{\delta_t \cdot (-\delta_k)/\delta_t} \prod_{k=1}^{K} e(g_1, m_k)^{\delta_k} = e(g_1, g_2)^{\delta_u \cdot \delta_v}$$

Accordingly, if the signature is correct, the second equation is satisfied.

Reason why security is provided even with symmetric bilinear mapping

Since symmetric bilinear mapping gives $$e(g_1, g_2)e(g_2, g_1^{-1}) = e(g_1, g_2)e(g_2, g_1)^{-1}$$
$$= 1$$

multiplying by $e(g_1, g_2)e(g_2, g_1^{-1})$ does not change the result of operations on the groups. For example, the first verification equation can be converted as follows.

$$e(g_u, g_v) = e(g_s, s)e(g_t, t)\left(\prod_{k=1}^{K} e(g_k, m_k)\right)e(w, r), =$$

$$e(g_s, s)e(g_t, t)e(g_1, m_1)e(g_2, m_2) \ldots e(g_K, m_K)e(w, r) = e(g_s, s)e(g_t, t)$$

$$e(g_1, m_1)e(g_1, g_2)e(g_2, g_1^{-1})e(g_2, m_2) \ldots e(g_K, m_K)e(w, r) =$$

$$e(g_s, s)e(g_t, t)e(g_1, m_1 g_2)e(g_2, m_2 g_1^{-1}) \ldots e(g_K, m_K)e(w, r)$$

It means that the first equation is satisfied even for a message M'=(m'$_1$, m'$_2$, . . . , m'$_K$) that includes m'$_1$ and m'$_2$ which are given by m'$_1$=m$_1$g$_2$ and m'$_2$=m$_2$g$_1^{-1}$. Accordingly, with symmetric bilinear mapping, the security of the signature cannot be ensured by the single equation alone.

The second equation for the message M' will be considered next. The right side of the second equation is given as follows.

$$e(h_s, s)e(h_t, t)e(h_1, m'_1)e(h_2, m'_2) \ldots e(h_K, m_K) =$$

$$e(h_s, s)e(h_t, t)e(h_1, m_1 g_2)e(h_2, m_2 g_1^{-1}) \ldots e(h_K, m_K) =$$

$$e(h_s, s)e(h_t, t)e(h_1, m_1)e(h_1, g_2)e(h_2, g_1^{-1})e(h_2, m_2) \ldots e(h_K, m_K)$$

Since $e(h_1, g_2)e(h_2, g_1^{-1})$ is not 1, the equation does not match the left side, $e(h_u, h_v)$. That is, the second equation is not satisfied. Accordingly, by using the two verification equations, security can be ensured even with symmetric bilinear mapping.

Effects

The signature verification system according to the present invention uses the two verification equations for verification and can ensure security even with symmetric bilinear mapping, like the method in Non-patent literature 3. Accordingly, an encryption protocol can be efficiently configured by combining the digital signature of the present invention with elements (a public key encryption method, commitment, etc.) of a different encryption protocol, generated on groups based on symmetric bilinear mapping. Moreover, since the signature σ consists of four group elements w, s, t, and r, the signature length is shorter than that in Non-patent literature 3, which requires seven group elements. The number of pairing operations in verification can be reduced to 7+2K.

Accordingly, the amount of computation becomes smaller than that for 10+2K operations in Non-patent literature 3.

Modification

A modification will be described also with reference to FIGS. 1 to 3. A signature verification system of the modification comprises at least a signature device 100' and a verification device 200'. The conditions of the groups and variables are the same as those in the first embodiment except that $\gamma_u$ and $\gamma_v$ are set to 0. In that case, $g_u=g_v=1$ and $e(g_u, g_v)=1$, and the public key vk does not require any information to obtain $e(g_u, g_v)$. The secret key sk does not require $\gamma_u$ or $\gamma_v$. A signature generating unit 120' should obtain r as follows.

$$r = \left(g_2^{-\gamma_s \cdot \rho} \cdot t^{-\gamma_t} \prod_{k=1}^{K} m_k^{-\gamma_k}\right)^{1/\zeta}$$

A verifying unit 210' should check whether the two equations given below are satisfied.

$$1 = e(g_s, s)e(g_t, t)(\Pi_{k=1}^{K} e(g_k, m_k))e(w, r),$$

$$e(h_u, h_v) = e(h_s, s)e(h_t, t)\Pi_{k=1}^{K} e(h_k, m_k)$$

In other words, the signature verification system of the present invention can be modified to a signature verification system that does not use $\gamma_u$, $\gamma_v$, $g_u$, or $g_v$, as follows.

A key generating unit 110' selects $\gamma_s$, $\delta_s$, $\gamma_t$, $\delta_t$, $\delta_u$, $\delta_v$, $\{\gamma_1, \delta_1\}$, . . . , $\{\gamma_K, \delta_K\}$ from integers between 0 and p−1, both inclusive. The selection should be made at random. Then, $g_s$, $h_s$, $g_t$, $h_t$, $h_u$, $h_v$, $\{g_1, h_1\}$, . . . , $\{g_K, h_K\}$ are obtained as follows (S110'):

| | |
|---|---|
| $g_s = g_1\hat{}\gamma_s$ | $h_s = g_1\hat{}\delta_s$ |
| $g_t = g_1\hat{}\gamma_t$ | $h_t = g_1\hat{}\delta_t$ |
| $h_u = g_1\hat{}\delta_u$ | |
| $h_v = g_2\hat{}\delta_v$ | |
| $g_k = g_1\hat{}\gamma_k$ | $h_k = g_1\hat{}\delta_k$ (k = 1, . . . , K) |

A signature recording unit 190' records information indicating p, $G_1$, $G_2$, $G_T$, e, $g_1$, and $g_2$, information needed to obtain $e(h_u, h_v)$, and data that includes $g_s$, $h_s$, $g_t$, $h_t$, $\{g_1, h_1\}$, . . . , $\{g_K, h_K\}$ as the public key vk and records data that includes vk, $\gamma_s$, $\delta_s$, $\gamma_t$, $\delta_t$, $\delta_u$, $\delta_v$, $\{\gamma_K, \delta_K\}$ as the secret key sk (S190'). For example, a statement Λ indicating p, $G_1$, $G_2$, $G_T$, e, $g_1$, and $g_2$, and $g_s$, $h_s$, $g_t$, $h_t$, $h_u$, $h_v$, $\{g_1, h_1\}$, . . . , $\{g_K, h_K\}$ may be held as the public key vk. Alternatively, a statement Λ indicating p, $G_1$, $G_2$, $G_T$, e, $g_1$, and $g_2$, and $g_2$, and $g_s$, $h_s$, $g_t$, $h_t$, $e(h_u, h_v)$, $\{g_1, h_1\}$, . . . , $\{g_K, h_K\}$ may be held as the public key vk.

The signature generating unit 120' selects ζ and ρ at random from integers between 0 and p−1, both inclusive, obtains w, s, t, and r, given as follows, and generates, as a signature σ, data that includes w, s, t, and r (S120').

$$w = g_1^\zeta,$$

$$s = g_2^\rho,$$

$$t = \left(g_2^{\delta_u \cdot \delta_v - \delta_s \cdot \rho} \prod_{k=1}^{K} m_k^{-\delta_k}\right)^{1/\delta_t}$$

-continued $$r = \left(g_2^{-\gamma_s \rho} \cdot t^{-\gamma_t} \prod_{k=1}^{K} m_k^{-\gamma_k}\right)^{1/\zeta}$$

A signature input-output unit 180' sends the signature σ through the network 800 to the verification device 200' (S180').

The verification device 200' comprises at least a verification recording unit 290' and the verifying unit 210'. The verification recording unit 290' records the public key vk (S290'). The verification device 200' may comprise a verification input-output unit 280' that exchanges data through the network 800. The verification input-output unit 280' receives the signature σ through the network 800 (S280').

The verifying unit 210' checks whether the following two verification equations are satisfied.

$$1 = e(g_s, s)e(g_t, t)(\Pi_{k=1}^{K} e(g_k, m_k))e(w, r),$$

$$e(h_u, h_v) = e(h_s, s)e(h_t, t)\Pi_{k=1}^{K} e(h_k, m_k)$$

If the two equations are satisfied, the verifying unit 210' determines that the signature is correct; if at least one of the two equations is not satisfied, the verifying unit 210' determines that the signature is incorrect (S210').

The modification differs from the first embodiment just in that $\gamma_u$ and $\gamma_v$ are set to 0. In that case, since $g_u = g_v = 1$ and $e(g_u, g_v) = 1$, if the signature is correct, the two equations given above are satisfied.

Like the method in non-patent literature 3, the modification uses the two verification equations in verification and can ensure security even with symmetric bilinear mapping. In addition, because the signature σ consists of four group elements w, s, t, and r, the signature is shorter than that in Non-patent literature 3, which requires seven group elements. Moreover, the number of paring operations in verification can be reduced to 6+2K. Accordingly, the amount of computation becomes smaller than that for 10+2K operations in Non-patent literature 3.

Program, Recording Medium

Each type of processing described above may be executed not only time sequentially according to the order of description but also in parallel or individually when necessary or according to the processing capabilities of the devices that execute the processing. Appropriate changes can be made to the above embodiments without departing from the scope of the present invention.

When the configurations described above are implemented by a computer, the processing details of the functions that should be provided by each device are described in a program. When the program is executed by a computer, the processing functions described above are implemented on the computer.

The program containing the processing details can be recorded in a computer-readable recording medium. The computer-readable recording medium can be any type of medium, such as a magnetic storage device, an optical disc, a magneto-optical recording medium, or a semiconductor memory.

This program is distributed by selling, transferring, or lending a portable recording medium such as a DVD or a CD-ROM with the program recorded on it, for example. The program may also be distributed by storing the program in a storage unit of a server computer and transferring the program from the server computer to another computer through the network.

A computer that executes this type of program first stores the program recorded on the portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, the devices are implemented by executing the predetermined programs on the computer, but at least a part of the processing details may be implemented by hardware.

INDUSTRIAL APPLICABILITY

The present invention can be used as a basic element in a variety of encryption protocols used for electronic money, credentials systems, and the like.

DESCRIPTION OF REFERENCE NUMERALS

100, 100': Signature device
110, 110': Key generating unit
120, 120': Signature generating unit
180, 180': Signature input-output unit
190, 190': Signature recording unit
200, 200': Verification device
210, 210': Verifying unit
280, 280': Verification input-output unit
290, 290': Verification recording unit
800: Network.

What is claimed is:

1. A signature verification system comprising:
   a signature device which includes processing circuitry configured to generate an electronic signature that is applied to electronic data, the electronic signature corresponding to a particular user, and to transmit the electronic data and the electronic signature to the verification device via a network, and
   a verification device, connected to the signature device via the network, which includes processing circuitry configured to receive the electronic data and the electronic signature, and to verify that the electronic data was transmitted by the particular user by verifying the electronic signature,
   wherein the processing circuitry of the signature device is configured to:
   record information indicating p, $G_1$, $G_2$, $G_T$, e, $g_1$, and $g_2$, information needed to obtain $e(g_u, g_v)$ and $e(h_u, h_v)$, and data that includes $g_s$, $h_s$, $g_t$, $h_t$, $\{g_1, h_1\}, \ldots, \{g_K, h_K\}$ as a public key vk and records data that includes vk, $\gamma_s$, $\delta_s$, $\gamma_t$, $\delta_t$, $\gamma_u$, $\delta_u$, $\gamma_v$, $\delta_v$, $\{\gamma_1, \delta_1\}, \ldots, \{\delta_K, \delta_K\}$ as a secret key sk;

select $\zeta$ and $\rho$ at random from integers between 0 and p−1, both inclusive, obtains w, s, t, and r, as given below, $$w = g_1^\zeta,$$

$$s = g_2^\rho,$$

$$t = \left(g_2^{\delta_u \cdot \delta_v - \delta_s \cdot \rho} \prod_{k=1}^{K} m_k^{-\delta_k}\right)^{1/\delta_t}$$

$$r = \left(g_2^{\gamma_u \cdot \gamma_v - \gamma_s \cdot \rho} \cdot t^{-\gamma_t} \prod_{k=1}^{K} m_k^{-\gamma_k}\right)^{1/\zeta}$$

and generate, as a signature σ, as the electronic signature, data that includes w, s, t, and r; and the processing circuitry of the verification device is configured to:
record the public key vk; and
check whether two equations $$e(g_u, g_v) = e(g_s, s)e(g_t, t)(\Pi_{k=1}^{K} e(g_k, m_k))e(w, r),$$

$$e(h_u, h_v) = e(h_s, s)e)(h_t, t)\Pi_{k=1}^{K} e(h_k, m_k)$$

are satisfied, and
determine that the electronic signature is correct when the two equations are satisfied, and determine that the electronic signature is incorrect when at least one of the two equations is not satisfied,
where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M=(m_1, \ldots, m_K)$, ^ represents a power;
$\gamma_s, \delta_s, \gamma_t, \delta_t, \gamma_u, \delta_u, \gamma_v, \delta_v, \{\gamma_1, \delta_1\}, \ldots, \{\gamma_K, \delta_K\}$ are integers between 0 and p−1, both inclusive; and
$g_s, h_s, g_t, h_t, g_u, h_u, g_v, h_v, \{g_1, h_1\}, \ldots, \{g_K, h_K\}$ are given as follows:
$g_s = g_1\hat{}\gamma_s$ $h_s = g_1\hat{}\delta_s$
$g_t = g_1\hat{}\gamma_t$ $h_t = g_1\hat{}\delta_t$
$g_u = g_1\hat{}\gamma_u$ $h_u = g_2\hat{}\delta_u$
$g_v = g_2\hat{}\gamma_v$ $h_v = g_1\hat{}\delta_v$
$g_k = g_1\hat{}\gamma_k$ $h_k = g_1\hat{}\delta_k$
where $k = 1, \ldots, K$.

2. A signature verification system comprising:
a signature device which includes processing circuitry configured to generate an electronic signature that is applied to electronic data, the electronic signature corresponding to a particular user, and to transmit the electronic data and the electronic signature to the verification device via a network, and
a verification device, connected to the signature device via a network, which includes processing circuitry configured to receive the electronic data and to verify that the electronic data was transmitted by the particular user by verifying the electronic signature,
wherein the processing circuitry of the signature device is configured to:
record information indicating p, $G_1$, $G_2$, $G_T$, e, $g_1$, and $g_2$, information needed to obtain $e(h_u, h_v)$, and data that includes $g_s, h_s, g_t, h_t, \{g_1, h_1\}, \ldots, \{g_K, h_K\}$ as a public key vk and records data that includes vk, $\gamma_s, \delta_s, \gamma_t, \delta_t, \gamma_u, \delta_u, \delta_v, \{\gamma_1, \delta_1\}, \ldots, \{\gamma_K, \delta_K\}$ as a secret key sk;
select $\zeta$ and $\rho$ at random from integers between 0 and p−1, both inclusive, obtains w, s, t, and r, as given below, $$w = g_1^\zeta,$$

$$s = g_2^\rho,$$

$$t = \left(g_2^{\delta_u \cdot \delta_v - \delta_s \cdot \rho} \prod_{k=1}^{K} m_k^{-\delta_k}\right)^{1/\delta_t}$$

$$r = \left(g_2^{-\gamma_s \cdot \rho} \cdot t^{-\gamma_t} \prod_{k=1}^{K} m_k^{-\gamma_k}\right)^{1/\zeta}$$

and generate, as a signature σ, as the electronic signature, data that includes w, s, t, and r; and
the processing circuitry of the verification device is configured to:
record the public key vk; and
check whether two equations $$1 = e(g_s, s)e(g_t, t)(\Pi_{k=1}^{K} e(g_k, m_k))e(w, r),$$

$$e(h_u, h_v) = e(h_s, s)e)(h_t, t)\Pi_{k=1}^{K} e(h_k, m_k)$$

are satisfied, and determine that the electronic signature is correct when the two equations are satisfied, or determine that the electronic signature is incorrect when at least one of the two equations is not satisfied,
where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M=(m_1, \ldots, m_K)$, ^ represents a power;
$\gamma_s, \delta_s, \gamma_t, \delta_t, \delta_u, \delta_v, \{\gamma_1, \delta_1\}, \ldots, \{\gamma_K, \delta_K\}$ are integers between 0 and p−1, both inclusive; and
$g_s, h_s, g_t, h_t, h_u, h_v, \{g_1, h_1\}, \ldots, \{g_K, k_K\}$ are given as follows:
$g_s = g_1\hat{}\gamma_s$ $h_s = g_1\hat{}\delta_s$
$g_t = g_1\hat{}\gamma_t$ $h_t = g_1\hat{}\delta_t$
$h_u = g_1\hat{}\delta_u$
$h_v = g_2\hat{}\delta_v$
$g_k = g_1\hat{}\gamma_k$ $h_k = g_1\hat{}\delta_k$
where $k = 1, \ldots, K$.

3. A signature device configured to generate an electronic signature that is applied to electronic data, the electronic signature corresponding to a particular user, and to transmit the electronic signature to a verification device, connected to the signature device via a network, that is configured to verify that the electronic data was transmitted by the particular user by verifying the electronic signature, the signature device comprising:
processing circuitry configured to
record information indicating p, $G_1$, $G_2$, $G_T$, e, $g_1$, and $g_2$, information needed to obtain $e(g_u, g_v)$ and $e(h_u, h_v)$, and data that includes $g_s, h_s, g_t, h_t, \{g_1, h_1\}, \ldots, \{g_K, h_K\}$ as a public key vk and records data that includes vk, $\gamma_s, \delta_s, \gamma_t, \delta_t, \gamma_u, \delta_u, \gamma_v, \delta_v, \{\gamma_1, \delta_1\}, \ldots, \{\gamma_K, \delta_K\}$ as a secret key sk;

select ζ and ρ at random from integers between 0 and p−1, both inclusive, obtains w, s, t, and r, as given below, $$w = g_1^\zeta,$$

$$s = g_2^\rho,$$

$$t = \left(g_2^{\delta_u \cdot \delta_v - \delta_s \cdot \rho} \prod_{k=1}^{K} m_k^{-\delta_k}\right)^{1/\delta_t}$$

$$r = \left(g_2^{\gamma_u \cdot \gamma_v - \gamma_s \cdot \rho} \cdot t^{-\gamma_t} \prod_{k=1}^{K} m_k^{-\gamma_k}\right)^{1/\zeta}$$

and generate, as a signature σ, as the electronic signature, data that includes w, s, t, and r;

where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M=(m_1, \ldots, m_K)$, ^ represents a power;

$\gamma_s, \delta_s, \gamma_t, \delta_t, \gamma_u, \delta_u, \gamma_v, \delta_v, \{\gamma_1, \delta_1\}, \ldots, \{\gamma_K, \delta_K\}$ are integers between 0 and p−1, both inclusive; and $g_s, h_s, g_t, h_t, g_u, h_u, g_v, h_v, \{g_1, h_1\}, \ldots, \{g_K, h_K\}$ are given as follows:

$g_s = g_1\hat{\ }\gamma_s$ $h_s = g_1\hat{\ }\delta_s$
$g_t = g_1\hat{\ }\gamma_t$ $h_t = g_1\hat{\ }\delta_t$
$g_u = g_1\hat{\ }\gamma_u$ $h_u = g_1\hat{\ }\delta_u$
$g_v = g_2\hat{\ }\gamma_v$ $h_v = g_2\hat{\ }\delta_v$
$g_k = g_1\hat{\ }\gamma_k$ $h_k = g_1\hat{\ }\delta_k$
where k=1, ..., K.

4. A signature device configured to generate an electronic signature that is applied to electronic data, the electronic signature corresponding to a particular user, and to transmit the electronic signature to a verification device, connected to the signature device via a network, that is configured to verify that the electronic data was transmitted by the particular user by verifying the electronic signature, the signature device comprising:

processing circuitry configured to record information indicating p, $G_1$, $G_2$, $G_T$, e, $g_1$, and $g_2$, information needed to obtain $e(h_u, h_v)$, and data that includes $g_s, h_s, g_t, h_t, \{g_1, h_1\}, \ldots, \{g_K, h_K\}$ as a public key vk and records data that includes vk, $\gamma_s, \delta_s, \gamma_t, \delta_t, \delta_u, \delta_v, \{\gamma_1, \delta_1\}, \ldots, \{\gamma_K, \delta_K\}$ as a secret key sk;

select ζ and ρ at random from integers between 0 and p−1, both inclusive, obtains w, s, t, and r, as given below, $$w = g_1^\zeta,$$

$$s = g_2^\rho,$$

$$t = \left(g_2^{\delta_u \cdot \delta_v - \delta_s \cdot \rho} \prod_{k=1}^{K} m_k^{-\delta_k}\right)^{1/\delta_t}$$

$$r = \left(g_2^{-\gamma_u \cdot \rho} \cdot t^{-\gamma_t} \prod_{k=1}^{K} m_k^{-\gamma_k}\right)^{1/\zeta}$$

and generate, as a signature σ, as the electronic signature, data that includes w, s, t, and r;

where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M=(m_1, \ldots, m_K)$, ^ represents a power;

$\gamma_s, \delta_s, \gamma_t, \delta_t, \delta_u, \delta_v, \{\gamma_1, \delta_1\}, \ldots, \{\gamma_K, \delta_K\}$ are integers between 0 and p−1, both inclusive; and $g_s, h_s, g_t, h_t, h_u, h_v, \{g_1, h_1\}, \ldots, \{g_K, k_K\}$ are given as follows:

$g_s = g_1\hat{\ }\gamma_s$ $h_s = g_1\hat{\ }\delta_s$
$g_t = g_1\hat{\ }\gamma_t$ $h_t = g_1\hat{\ }\delta_t$
$h_u = g_1\hat{\ }\delta_u$
$h_v = g_2\hat{\ }\delta_v$
$g_k = g_1\hat{\ }\gamma_k$ $h_k = g_1\hat{\ }\delta_k$
where k=1, ..., K.

5. A verification device configured to receive an electronic signature that is applied to electronic data, the electronic signature corresponding to a particular user and being received, along with the electronic data, from a signature device, connected to the verification device via a network, and the verification device being configured to verify that the electronic data was transmitted by the particular user by verifying the electronic signature, the verification device comprising:

processing circuitry configured to record information indicating p, $G_1$, $G_2$, $G_T$, e, $g_1$, and $g_2$, information needed to obtain $e(g_u, g_v)$ and $e(h_u, h_v)$, and data that includes $g_s, h_s, g_t, h_t, \{g_1, h_1\}, \ldots, \{g_K, h_K\}$ as a public key vk;

check whether two equations $$e(g_u, g_v) = e(g_s, s) e(g_t, t) (\Pi_{k=1}^{K} e(g_k, m_k)) e(w, r),$$

$$e(h_u, h_v) = e(h_s, s) e(h_t, t) \Pi_{k=1}^{K} e(h_k, m_k)$$

are satisfied, and determine that the electronic signature is correct when the two equations are satisfied, or determine that the electronic signature is incorrect when at least one of the two equations is not satisfied, where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, m_K$ represent elements of group $G_1$, message M, as the electronic data, is $M=(m_1, m_K)$, ^ represents a power;

$\gamma_s, \delta_s, \gamma_t, \delta_t, \gamma_u, \delta_u, \gamma_v, \delta_v, \{\gamma_1, \delta_1\}, \ldots, \{\gamma_K, \delta_K\}$ are integers between 0 and p−1, both inclusive; and $g_s, h_s, g_t, h_t, g_u, h_u, g_v, h_v, \{g_1, h_1\}, \ldots, \{g_K, h_K\}$ are given as follows:

$g_s = g_1\hat{\ }\gamma_s$ $h_s = g_1\hat{\ }\delta_s$
$g_t = g_1\hat{\ }\gamma_t$ $h_t = g_1\hat{\ }\delta_t$
$g_u = g_1\hat{\ }\gamma_u$ $h_u = g_1\hat{\ }\delta_u$
$g_v = g_2\hat{\ }\gamma_v$ $h_v = g_2\hat{\ }\delta_v$
$g_k = g_1\hat{\ }\gamma_k$ $h_k = g_1\hat{\ }\delta_k$
where k=1, ..., K.

6. A verification device configured to receive an electronic signature that is applied to electronic data, the electronic signature corresponding to a particular user and being received, along with the electronic data, from a signature device, connected to the verification device via a network, and the verification device being configured to verify that the electronic data was transmitted by the particular user by verifying the electronic signature, the verification device comprising:
  processing circuitry configured to
    record information indicating p, $G_1$, $G_2$, $G_T$, e, $g_1$, and $g_2$, information needed to obtain $e(h_u, h_v)$, and data that includes $g_s$, $h_s$, $g_t$, $h_t$, $\{g_1, h_1\}, \ldots, \{g_K, h_K\}$ as a public key vk;
    check whether two equations $$1 = e(g_s, s)e(g_t, t)(\Pi_{k=1}^{K} e(g_k, m_k))e(w, r),$$

$$e(h_u, h_v) = e(h_s, s)e(h_t, t)\Pi_{k=1}^{K} e(h_k, m_k)$$

are satisfied, and
    determine that the electronic signature is correct when the two equations are satisfied, or determine that the electronic signature is incorrect when at least one of the two equations is not satisfied,
    where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M = (m_1, \ldots, m_K)$, ˆ represents a power;
    $\gamma_s$, $\delta_s$, $\gamma_t$, $\delta_t$, $\delta_u$, $\delta_v$, $\{\gamma_1, \delta_1\}, \ldots, \{\gamma_K, \delta_K\}$ are integers between 0 and p−1, both inclusive; and
    $g_s$, $h_s$, $g_t$, $h_t$, $h_u$, $h_v$, $\{g_1, h_1\}, \ldots, \{g_K, k_K\}$ are given as follows:
    $g_s = g_1\hat{}\gamma_s$ $h_s = g_1\hat{}\delta_s$
    $g_t = g_1\hat{}\gamma_t$ $h_t = g_1\hat{}\delta_t$
    $h_u = g_1\hat{}\delta_u$
    $h_v = g_2\hat{}\delta_v$
    $g_k = g_1\hat{}\gamma_k$ $h_k = g_1\hat{}\delta_k$
    where $k = 1, \ldots, K$.

7. A signature verification method used in a signature verification system that includes a signature device which includes processing circuitry configured to generate an electronic signature that is applied to electronic data, the electronic signature corresponding to a particular user, and to transmit the electronic data and the electronic signature to the verification device via a network, and a verification device, connected to the signature device via a network, which includes processing circuitry configured to receive the electronic data and to verify that the electronic data was transmitted by the particular user by verifying the electronic signature, the signature verification method comprising:
  a signature recording step in which the signature device records information indicating p, $G_1$, $G_2$, $G_T$, e, $g_1$, and $g_2$, information needed to obtain $e(g_u, g_v)$ and $e(h_u, h_v)$, and data that includes $g_s$, $h_s$, $g_t$, $h_t$, $\{g_1, h_1\}, \ldots, \{g_K, h_K\}$ as a public key vk and records data that includes vk, $\gamma_s$, $\delta_s$, $\gamma_t$, $\delta_t$, $\gamma_u$, $\delta_u$, $\gamma_v$, $\delta_v$, $\{\gamma_1, \delta_1\}, \ldots, \{\gamma_K, \delta_K\}$ as a secret key sk;
  a signature generating step in which the signature device selects $\zeta$ and $\rho$ at random from integers between 0 and p−1, both inclusive, obtains w, s, t, and r, as given below, $$w = g_1^{\zeta},$$

$$s = g_2^{\rho},$$

$$t = \left(g_2^{\delta_u \cdot \delta_v - \delta_s \cdot \rho} \prod_{k=1}^{K} m_k^{-\delta_k}\right)^{1/\delta_t}$$

$$r = \left(g_2^{\gamma_u \cdot \gamma_v - \gamma_s \cdot \rho} \cdot t^{-\gamma_t} \prod_{k=1}^{K} m_k^{-\gamma_k}\right)^{1/\zeta}$$

and generates, as a signature σ, as the electronic signature, data that includes w, s, t, and r;
  a verification recording step in which the verification device records the public key vk; and
  a verifying step in which the verification device checks whether two equations $$e(g_u, g_v) = e(g_s, s)e(g_t, t)(\Pi_{k=1}^{K} e(g_k, m_k))e(w, r),$$

$$e(h_u, h_v) = e(h_s, s)e(h_t, t)\Pi_{k=1}^{K} e(h_k, m_k)$$

are satisfied, and determines that the electronic signature is correct when the two equations are satisfied, or determines that the electronic signature is incorrect when at least one of the two equations is not satisfied,
    where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M = (m_1, \ldots, m_K)$, ˆ represents a power;
    $\gamma_s$, $\delta_s$, $\gamma_t$, $\delta_t$, $\gamma_u$, $\delta_u$, $\gamma_v$, $\delta_v$, $\{\gamma_1, \delta_1\}, \ldots, \{\gamma_K, \delta_K\}$ are integers between 0 and p−1, both inclusive; and
    $g_s$, $h_s$, $g_t$, $h_t$, $g_u$, $h_u$, $g_v$, $h_v$, $\{g_1, h_1\}, \ldots, \{g_K, h_K\}$ are given as follows:
    $g_s = g_1\hat{}\gamma_s$ $h_s = g_1\hat{}\delta_s$
    $g_t = g_1\hat{}\gamma_t$ $h_t = g_1\hat{}\delta_t$
    $g_u = g_1\hat{}\gamma_u$ $h_u = g_1\hat{}\delta_u$
    $g_v = g_2\hat{}\gamma_v$ $h_v = g_2\hat{}\delta_v$
    $g_k = g_1\hat{}\gamma_k$ $h_k = g_1\hat{}\delta_k$
    where $k = 1, \ldots, K$.

8. A signature verification method used in a signature verification system that includes a signature device which includes processing circuitry configured to generate an electronic signature that is applied to electronic data, the electronic signature corresponding to a particular user, and to transmit the electronic data and the electronic signature to the verification device via a network, and a verification device, connected to the signature device via a network, which includes processing circuitry configured to receive the electronic data and to verify that the electronic data was transmitted by the particular user by verifying the electronic signature, the signature verification method comprising:

a signature recording step in which the signature device records information indicating p, $G_1$, $G_2$, $G_T$, e, $g_1$, and $g_2$, information needed to obtain $e(h_u, h_v)$, and data that includes $g_s$, $h_s$, $g_t$, $h_t$, $\{g_1, h_1\}, \ldots, \{g_K, h_K\}$ as a public key vk and records data that includes vk, $\gamma_s$, $\delta_s$, $\gamma_t$, $\delta_t$, $\delta_u$, $\delta_v$, $\{\gamma_1, \delta_1\}, \ldots, \{\gamma_K, \delta_K\}$ as a secret key sk;

a signature generating step in which the signature device selects $\zeta$ and $\rho$ at random from integers between 0 and p−1, both inclusive, obtains w, s, t, and r, as given below, $$w = g_1^\zeta,$$
$$s = g_2^\rho,$$
$$t = \left(g_2^{\delta_u \cdot \delta_v - \delta_s \cdot \rho} \prod_{k=1}^{K} m_k^{-\delta_k}\right)^{1/\delta_t}$$
$$r = \left(g_2^{-\gamma_u \cdot \rho} \cdot t^{-\gamma_t} \prod_{k=1}^{K} m_k^{-\gamma_k}\right)^{1/\zeta}$$

and generates, as a signature σ, as the electronic signature, data that includes w, s, t, and r;

a verification recording step in which the verification device records the public key vk; and a verifying step in which the verification device checks whether two equations $$1 = e(g_s, s)e(g_t, t)(\Pi_{k=1}^{K} e(g_k, m_k))e(w, r),$$

$$e(h_u, h_v) = e(h_s, s)e(h_t, t)\Pi_{k=1}^{K} e(h_k, m_k)$$

are satisfied, and determines that the electronic signature is correct when the two equations are satisfied, or it is determined that the electronic signature is incorrect when at least one of the two equations is not satisfied, where $G_1$, $G_2$, and $G_T$ represent groups of order p, e represents pairing of $G_1 \times G_2 \to G_T$, $g_1$ represents any generator of group $G_1$, $g_2$ represents any generator of group $G_2$, K represents a predetermined integer not smaller than 1, k represents an integer between 1 and K, both inclusive, $m_1, \ldots, m_K$ represent elements of group $G_1$, message M, as the electronic data, is $M = (m_1, \ldots, m_K)$, ^ represents a power;

$\gamma_s$, $\delta_s$, $\gamma_t$, $\delta_t$, $\delta_u$, $\delta_v$, $\{\gamma_1, \delta_1\}, \ldots, \{\gamma_K, \delta_K\}$ are integers between 0 and p−1, both inclusive; and $g_s$, $h_s$, $g_t$, $h_t$, $h_u$, $h_v$, $\{g_1, h_1\}, \ldots, \{g_K, k_K\}$ are given as follows:

$g_s = g_1\hat{\,}\gamma_s \; h_s = g_1\hat{\,}\delta_s$
$g_t = g_1\hat{\,}\gamma_t \; h_t = g_1\hat{\,}\delta_t$
$h_u = g_1\hat{\,}\delta_u$
$h_v = g_2\hat{\,}\delta_v$
$g_k = g_1\hat{\,}\gamma_k \; h_k = g_1\hat{\,}\delta_k$ where k=1, ..., K.

* * * * *